(12) United States Patent
Song

(10) Patent No.: US 7,958,914 B2
(45) Date of Patent: Jun. 14, 2011

(54) LIQUID CRYSTAL DROPPING APPARATUS FOR LIQUID CRYSTAL DISPLAY DEVICE

(75) Inventor: Tae Joon Song, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 1055 days.

(21) Appl. No.: 11/635,675

(22) Filed: Dec. 8, 2006

(65) Prior Publication Data

US 2007/0160773 A1    Jul. 12, 2007

(30) Foreign Application Priority Data

Dec. 30, 2005   (KR) .................. 10-2005-0134751

(51) Int. Cl.
*B65B 1/20*       (2006.01)
*G02F 1/13*       (2006.01)

(52) U.S. Cl. ............ 141/69; 141/11; 141/250; 141/256; 349/187; 349/189

(58) Field of Classification Search ............... 141/1, 11, 141/69, 250, 256; 349/187, 189; 222/20, 222/52, 481, 501, 507, 544
See application file for complete search history.

(56) References Cited

U.S. PATENT DOCUMENTS

| | | | |
|---|---|---|---|
| 6,055,035 A | 4/2000 | von Gutfeld et al. | |
| 6,182,907 B1 | 2/2001 | Nakagawa et al. | |
| 6,610,364 B1 * | 8/2003 | Kweon et al. | 427/256 |
| 6,844,908 B2 * | 1/2005 | Kim et al. | 349/187 |
| 6,997,216 B2 * | 2/2006 | Ryu et al. | 141/67 |
| 7,284,574 B2 * | 10/2007 | Fontaine et al. | 141/72 |
| 2003/0178447 A1 | 9/2003 | Kim et al. | |
| 2004/0256025 A1 | 12/2004 | Kweon et al. | |
| 2005/0134791 A1 | 6/2005 | Iwata et al. | |

FOREIGN PATENT DOCUMENTS

| | | |
|---|---|---|
| CN | 1441292 A | 9/2003 |
| JP | 4-362922 A | 12/1992 |
| JP | 8-332427 A | 12/1996 |
| JP | 09-000994 A | 1/1997 |
| JP | 2003-001160 A | 1/2003 |
| JP | 2003-057666 A | 2/2003 |
| JP | 2003-248231 A | 9/2003 |
| JP | 2003-255367 A | 9/2003 |
| JP | 2003-279917 A | 10/2003 |
| JP | 2003-279920 A | 10/2003 |
| JP | 2003-280014 A | 10/2003 |
| JP | 2003-280015 A | 10/2003 |
| JP | 2003-287730 A | 10/2003 |
| JP | 2003-295199 A | 10/2003 |

(Continued)

*Primary Examiner* — Timothy L Maust
(74) *Attorney, Agent, or Firm* — Birch, Stewart, Kolasch & Birch, LLP

(57) ABSTRACT

A liquid crystal dropping apparatus is used in the manufacture of liquid crystal display devices, which is designed to apply vibration energy to liquid crystal charged in a liquid crystal container, thereby allowing the liquid crystal to be dropped as a spray. The liquid crystal dropping apparatus includes a liquid crystal container in which liquid crystal is charged so that a pressure is applied to the liquid crystal if gas is supplied into the liquid crystal container, an opening and closing device for opening and closing a liquid crystal discharge hole provided at a lower end of the liquid crystal container, and a vibration energy supply device for supplying vibration energy to the interior of the liquid crystal container.

17 Claims, 6 Drawing Sheets

FOREIGN PATENT DOCUMENTS

| | | |
|---|---|---|
| JP | 2003-307740 A | 10/2003 |
| JP | 2004-004448 A | 1/2004 |
| JP | 2004-004608 A | 1/2004 |
| JP | 2004-9040 A | 1/2004 |
| JP | 2004-46153 A | 2/2004 |
| JP | 2005-107183 A | 4/2005 |
| JP | 2006-189791 A | 7/2006 |
| SU | 1681975 A1 | 10/1991 |
| TW | 200411310 A | 7/2004 |
| TW | 200500147 A | 1/2005 |
| TW | 200500148 A | 1/2005 |
| TW | 200521581 A | 7/2005 |

* cited by examiner

LIQUID CRYSTAL DROPPING APPARATUS FOR LIQUID CRYSTAL DISPLAY DEVICE

This application claims the benefit under 35 U.S.C. §119 of Korean Patent Application No. 10-2005-0134751, filed on Dec. 30, 2005, which is hereby incorporated by reference as if fully set forth herein.

BACKGROUND OF THE INVENTION

1. Field of the Invention

The invention relates to a liquid crystal dropping apparatus for liquid crystal display devices, and more particularly, to a liquid crystal dropping apparatus to manufacture liquid crystal display devices, which is designed to apply vibration energy to a liquid crystal charged in a liquid crystal container, thereby allowing the liquid crystal to be dropped as a spray.

2. Discussion of the Related Art

Generally, a liquid crystal display device is formed from two substrates coupled to face each other, and a liquid crystal layer formed between the two substrates.

The two substrates bond to each other by use of a seal material so that a regular space is defined between the two substrates. The liquid crystal layer, which is formed between the two substrates, serves to control the amount of light being transmitted through the device. The liquid crystal molecules are driven by drive elements formed on the respective substrates, thereby performing the function of displaying information.

Such a liquid crystal display device is usually manufactured by either a liquid crystal injection method or a liquid crystal dropping method.

In the liquid crystal injection method, two substrates, which are respectively formed with drive elements and color filter elements, are bonded to each other with a regular distance between the substrates by using a seal material having a liquid crystal injection port. After curing of the seal material, the bonded substrates are cut per unit panel. Then, a liquid crystal material is injected into the space between the two substrates through the liquid crystal injection port.

To inject the liquid crystal material, more particularly, to inject liquid crystalline solution, into the space between the two substrates, the bonded substrates are first put into a vacuum container to create a vacuum between the two substrates. Thereafter, the liquid crystal injection port is inserted into a container in which the liquid crystal solution is contained. In such a state, if the internal pressure of the vacuum container is changed from a vacuum into atmospheric pressure, the liquid crystal solution will be injected into the space between the two substrates. After completing the injection of the liquid crystal solution, the liquid crystal injection port is sealed by use of an appropriate seal material.

On the other hand, in the liquid crystal dropping method, an appropriate amount of liquid crystal is first dropped onto any one of the two substrates. The two substrates are then bonded to each other by use of a seal material.

Hereafter, a method for manufacturing a liquid crystal display device using a related art liquid crystal injection process will be described with reference to the drawings.

FIG. 1 shows a schematic view illustrating a related art liquid crystal injection process.

As shown in FIG. 1, a liquid crystal container 102, in which liquid crystal 101 is received, is disposed and fixed inside a vacuum container 103. If multiple panels 104, which are bonded to one another and each having a liquid crystal injection port, are put into the vacuum container 103, then the internal pressure of the vacuum container 103 is kept at a vacuum pressure so as to create a vacuum between the two substrates of each panel while removing moisture and air bubbles remaining in the vacuum container 103.

Subsequently, after the liquid crystal injection port of each panel is immersed in or comes into contact with the liquid crystal 101, nitrogen ($N_2$) gas is introduced into the vacuum container 103 to change the internal pressure of the vacuum container 103 from a vacuum to atmospheric pressure. In this case, since the interior of the vacuum container 103 is at atmospheric pressure, but the space between the two substrates of each panel 104 is still kept at a vacuum, the liquid crystal 101 will inject into the space between the two substrates through the liquid crystal injection port via the above described pressure differential.

Once the liquid crystal 101 is completely charged into each panel 104, a sealing process for sealing the liquid crystal injection port is performed. Finally, all the panels 104 are washed.

The above described liquid crystal injection process, however, has disadvantages arising from the excessively long time required to inject the liquid crystal, because the liquid crystal injection port must be immersed into or come into contact with the liquid crystal after subsequently cutting the unit panels and creating a vacuum between the two substrates of each panel. Thus, the related art liquid crystal injection process as stated above suffers from deteriorated productivity.

Moreover, in the case of manufacturing a large-area liquid crystal display device, there is a risk in that the liquid crystal is incompletely injected into the panel, causing defective products.

SUMMARY OF THE INVENTION

Accordingly, the invention is directed to a liquid crystal dropping apparatus for liquid crystal display devices that substantially obviates one or more problems due to limitations and disadvantages of the related art.

An object of the invention is, in part, to provide a liquid crystal dropping apparatus for use in the manufacture of liquid crystal display devices, which is designed to apply vibration energy using ultrasonic waves to liquid crystalline material charged in a liquid crystal container thereof, thereby allowing the liquid crystals to be dropped as a spray.

The invention, in part, pertains to a liquid crystal dropping apparatus for use in the manufacture of liquid crystal display devices, which includes a liquid crystal container charging liquid crystal so that a pressure is applied to the liquid crystal; an opening and closing device for opening and closing a liquid crystal discharge hole provided at a lower end of the liquid crystal container; and a vibration energy supply device for supplying vibration energy to the interior of the liquid crystal container It is to be understood that both the foregoing general description and the following detailed description of the invention are exemplary and explanatory and are intended to provide further explanation of the invention as claimed. Additional advantages, objects, and features of the invention will be set forth in part in the description which follows and in part will become apparent to those having ordinary skill in the art upon examination of the following or may be learned from practice of the invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the invention, examples of which are illustrated in the accompanying drawings. Wherever possible, the same reference numbers will be used throughout the drawings to refer to the same or like parts.

Figure 1:
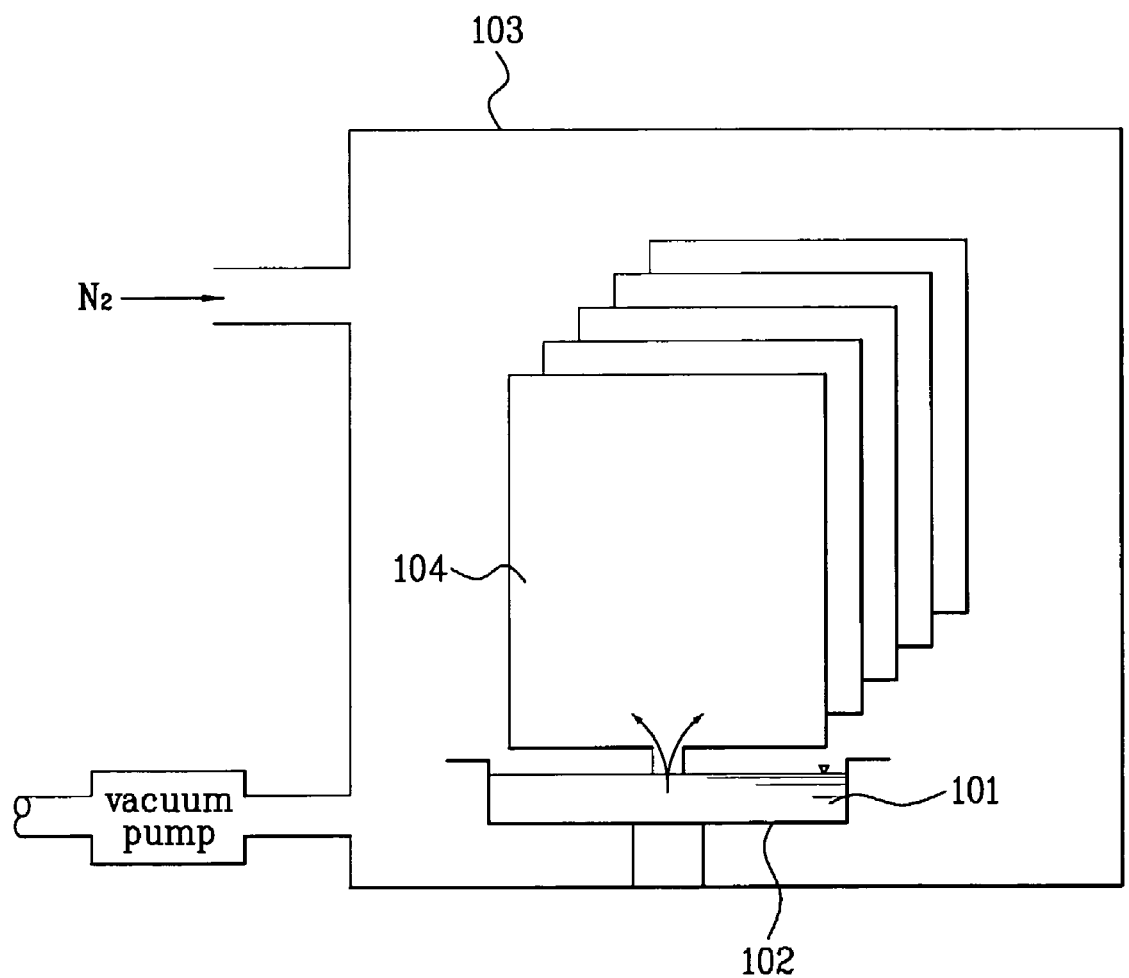
FIG. 1 shows a schematic view illustrating a conventional liquid crystal injection process.
Figure 2:
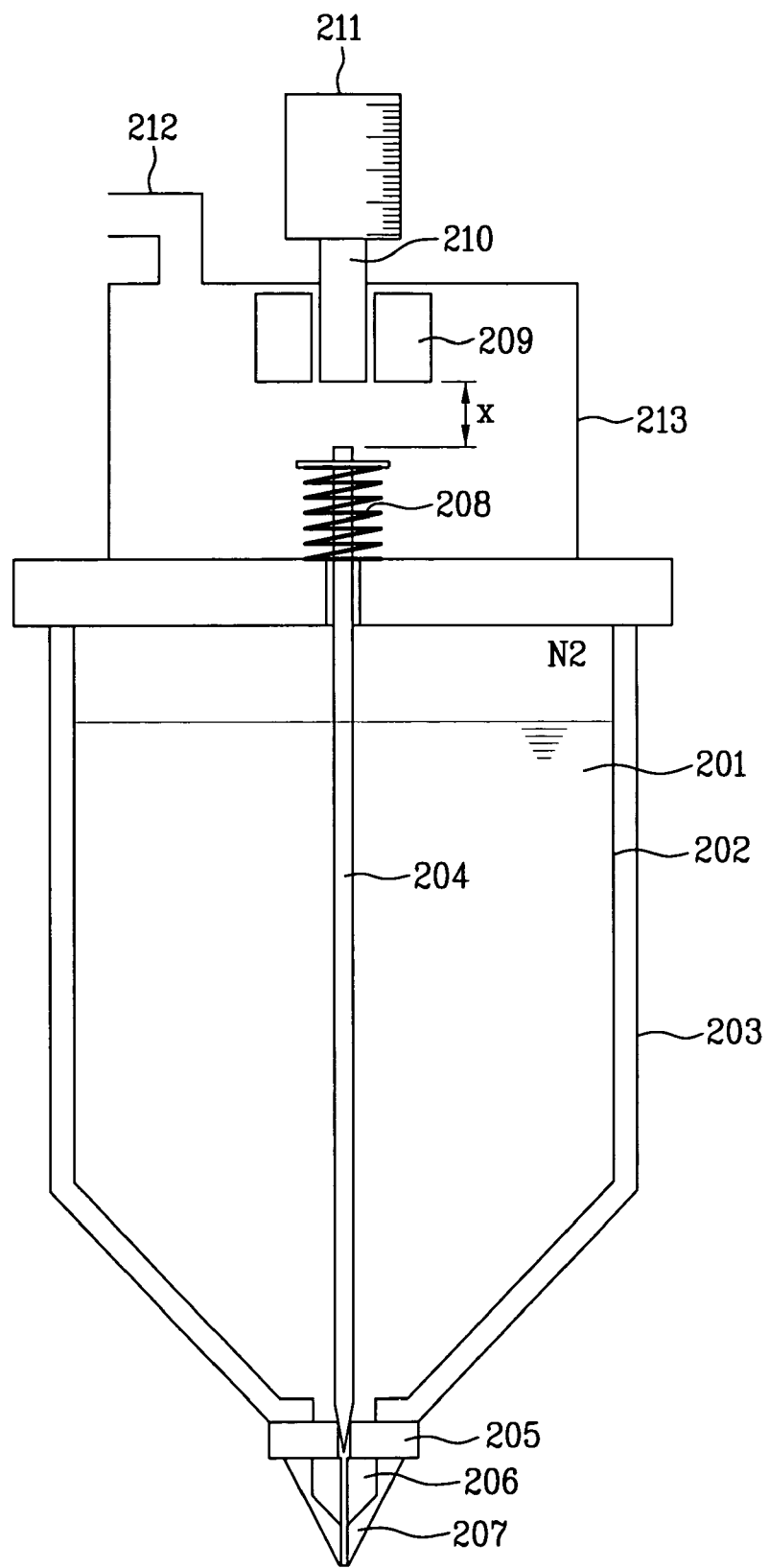
FIG. 2 shows a sectional view illustrating the configuration of a liquid crystal dropping apparatus for liquid crystal display devices according to a first preferred embodiment of the invention.

FIG. 2 shows a sectional view illustrating the configuration of a liquid crystal dropping apparatus for liquid crystal display devices according to a first preferred embodiment of the invention.

As shown in FIG. 2, the liquid crystal dropping apparatus for use in the manufacture of liquid crystal display devices according to the invention includes a cylindrical liquid crystal container 202 in which liquid crystal 201 is charged. A case 203 is configured to receive the liquid crystal container 202.

The liquid crystal container 202 is made of polyethylene or other suitable plastic, and the case 203 is made of stainless steel or other suitable metal. Since polyethylene has excellent formability sufficient to form a desired container shape in a simplified manner and also has no reactivity with liquid crystals, it has been used to form the liquid crystal container 202. However, polyethylene has a low strength and thus, tends to be easily deformed by an external shock. If the liquid crystal container is deformed by an external shock, it may make it impossible to drop liquid crystal at an accurate position. Therefore, the polyethylene liquid crystal container has to be received in the high-strength stainless steel case. However, other materials can be used. For example, the liquid crystal container 202 can also be formed from polypropylene or polybutylene. The case 203 can also be formed from such materials as carbon steel, chrome steel, zinc, hastalloy, etc.

The interior of the liquid crystal container 202 is provided with a vertical needle 204 that is made of a magnetic material. The needle 204 is secured to the liquid crystal container 202 in a vertically movable manner.

Specifically, the needle 204 takes the form of a bar or cylinder and has a conical lower end configured to be inserted into an opening perforated in a needle seat 205 that is provided at the bottom of the liquid crystal container 202. An elastic member 208, such as a spring, is installed around an upper end of the needle 204 so that the elastic member 208 is disposed over the liquid crystal container 202. With this configuration, after being moved upward, the needle 204 will be able to move downward again to its original position by the restoration force of the elastic member 208, whereby the conical lower end of the needle 204 can be displaced to open and close the opening of the needle seat 205. The elastic member 208 need not be a spring, for example, a suitable elastic polymer can be used as the elastic member 208.

Toward the lower end of the needle seat 205 are coupled a nozzle 206 and a nozzle cover 207, which are formed with openings having predetermined sizes for the discharge of the liquid crystal 201.

The nozzle cover 207 serves as a coupler, i.e., a coupling means, for securing the nozzle 206 at a fixed position. The nozzle 206 can be selected from among a variety of nozzles having liquid crystal discharge openings of different sizes and freely exchangeable for regulating the amount of liquid crystal 201 to be dropped.

An upper case 213 couples to the top of the liquid crystal container 202 and in turn, a gas supply pipe 212 is connected to the upper case 213.

The upper case 213, which is disposed over the top of the liquid crystal container 202, is mounted with a magnetic bar 210 having a gap regulator 211. The magnetic bar 210 is made of a ferromagnetic material or soft magnetic material. A cylindrical solenoid coil 209 is mounted around an outer circumference of the magnetic bar 210. The solenoid coil 209 is connected to a power source (not shown in the drawing). If power is supplied to the solenoid coil 209, the magnetic bar 210 generates a magnetic force. With the interaction with the magnetic force, the needle 204 can consequently be moved upward. Then, if the supply of power to the solenoid coil 209 is removed, the needle 204 moves downward to its original position by the restoration force of the elastic member 208, thereby allowing the liquid crystal 201 to be dropped onto a desired position.

Now, the operation of the above-described liquid crystal dropping apparatus for use in the manufacture of liquid crystal display devices according to the first preferred embodiment of the invention will be described.

First, if a predetermined amount of liquid crystal 201 is charged into the liquid crystal container 202, nitrogen gas is supplied into the liquid crystal container 202 through the gas supply pipe 212. The gas is not restricted to nitrogen, and other suitable inert gases can be used, such as argon.

Here, nitrogen gas is supplied to maintain the internal pressure of the liquid crystal container 202 at a regular level. If a certain region in the liquid crystal container 202 where no liquid crystal 201 is charged, is subjected to a pressure variation during the dropping of the liquid crystal 201, the result may be an irregular amount of liquid crystal 201 being dropped. Accordingly, the internal pressure of the liquid crystal container 202 is preferably maintained at a regular level.

Subsequently, if power is applied to the solenoid coil 209, the needle 204, which is made of a magnetic material, will move upward by the magnetic force generated from the magnetic bar 210. This is because the needle 204 is secured to the liquid crystal container 202 in a vertically movable manner.

Accordingly, the opening of the needle seat 205, which was closed by the end of the needle 204, opens so that the liquid crystal 201 drop through the openings of the nozzle 206 and the nozzle cover 207.

On the other hand, if the supply of power to the solenoid coil 209 is removed, the needle 204 moves downward by an attractive force of the elastic member 208 that is attached between the upper end of the needle 204 and the liquid crystal container 202, so as to close the opening of the needle seat 205.

Figure 3:
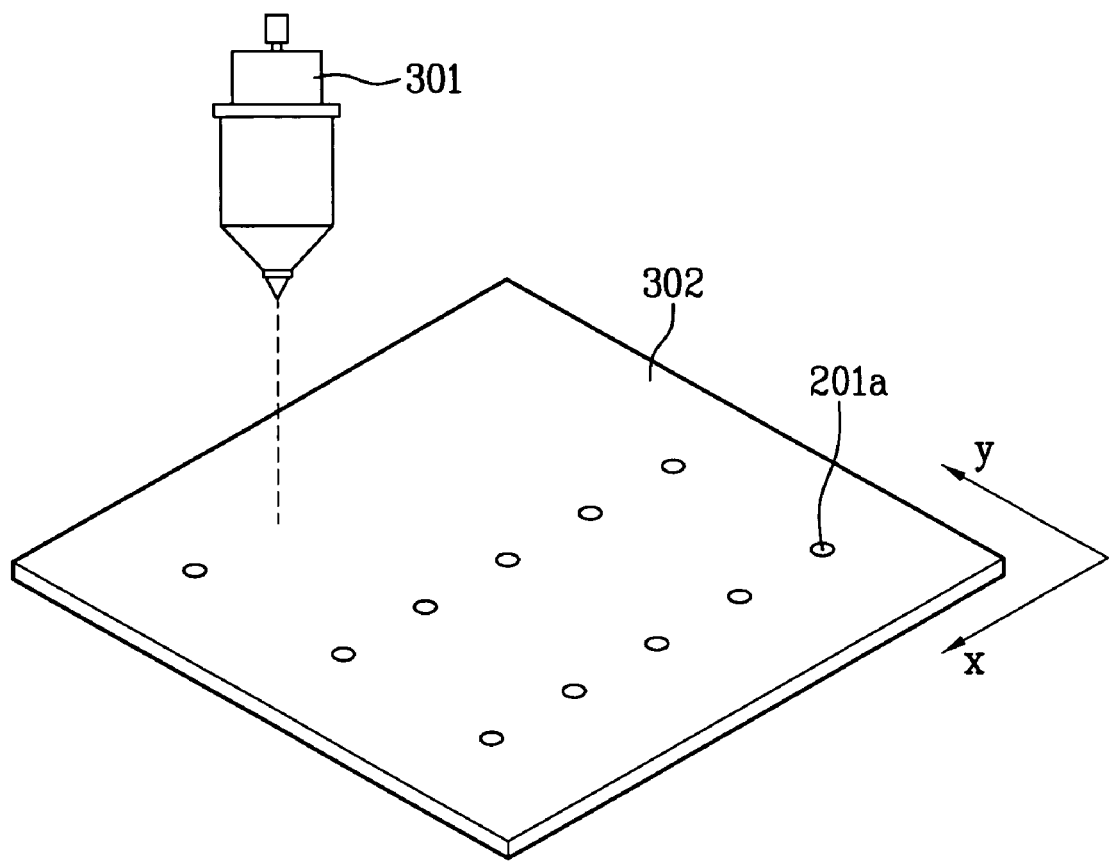
FIG. 3 shows a perspective view illustrating the basic concept of a dropping process using the liquid crystal dropping apparatus for liquid crystal display devices according to the first preferred embodiment of the invention.

FIG. 3 shows a perspective view illustrating the basic concept of the dropping process using the liquid crystal dropping apparatus for use in the manufacture of liquid crystal display devices according to the first preferred embodiment of the invention.

Here, the liquid crystal 201 is dropped in droplet form onto a substrate 302.

The substrate 302 is set to move in X-axis and Y-axis directions by a preset speed, and the dropping apparatus 301 is set to drop the liquid crystal 201 at a preset time interval. Therefore, liquid crystal droplets 201a are dropped onto the substrate 302 so that they are arranged at a regular distance.

It may generally be assumed that the substrate 302 has a fixed position and only the dropping apparatus 301 is moved in X-axis and Y-axis directions to allow the liquid crystal 201 to be dropped by a regular distance. However, in this case, there is a risk in that the liquid crystal droplets 201a may be subjected to shaking due to movements of the dropping apparatus 301, and this may cause errors in the dropping position and dropping amount of the liquid crystal droplets 201a. Therefore, it is preferable that the dropping apparatus 301 be maintained at a fixed position and that the substrate 302 be moved.

However, in the above described liquid crystal dropping apparatus for use in the manufacture of liquid crystal display devices according to the first preferred embodiment of the invention, since the liquid crystal 201 is dropped in the form of droplets onto the substrate 302, the substrate 302 may suffer from unwanted spots according to the amount, position, and size of the liquid crystal droplets 201a. Further, although the dropped liquid crystal droplets 201a are spread and merged together by a pressure applied during a subsequent substrate bonding process, the liquid crystal droplets 201a have a limit in spreading. Therefore, voids inevitably occur in boundary portions between the liquid crystal droplets 201 and corner portions of the substrate 302. These voids are a factor of causing spots on a screen.

To solve the above-described problem expressed in the first preferred embodiment of the invention, vibration energy can be applied to the interior of the liquid crystal container to allow the liquid crystal to be dropped in a spray manner, i.e., as an aerosol. Now, a liquid crystal dropping apparatus for use in the manufacture of liquid crystal display devices according to a second preferred embodiment of the invention will be described in more detail.

Figure 4:
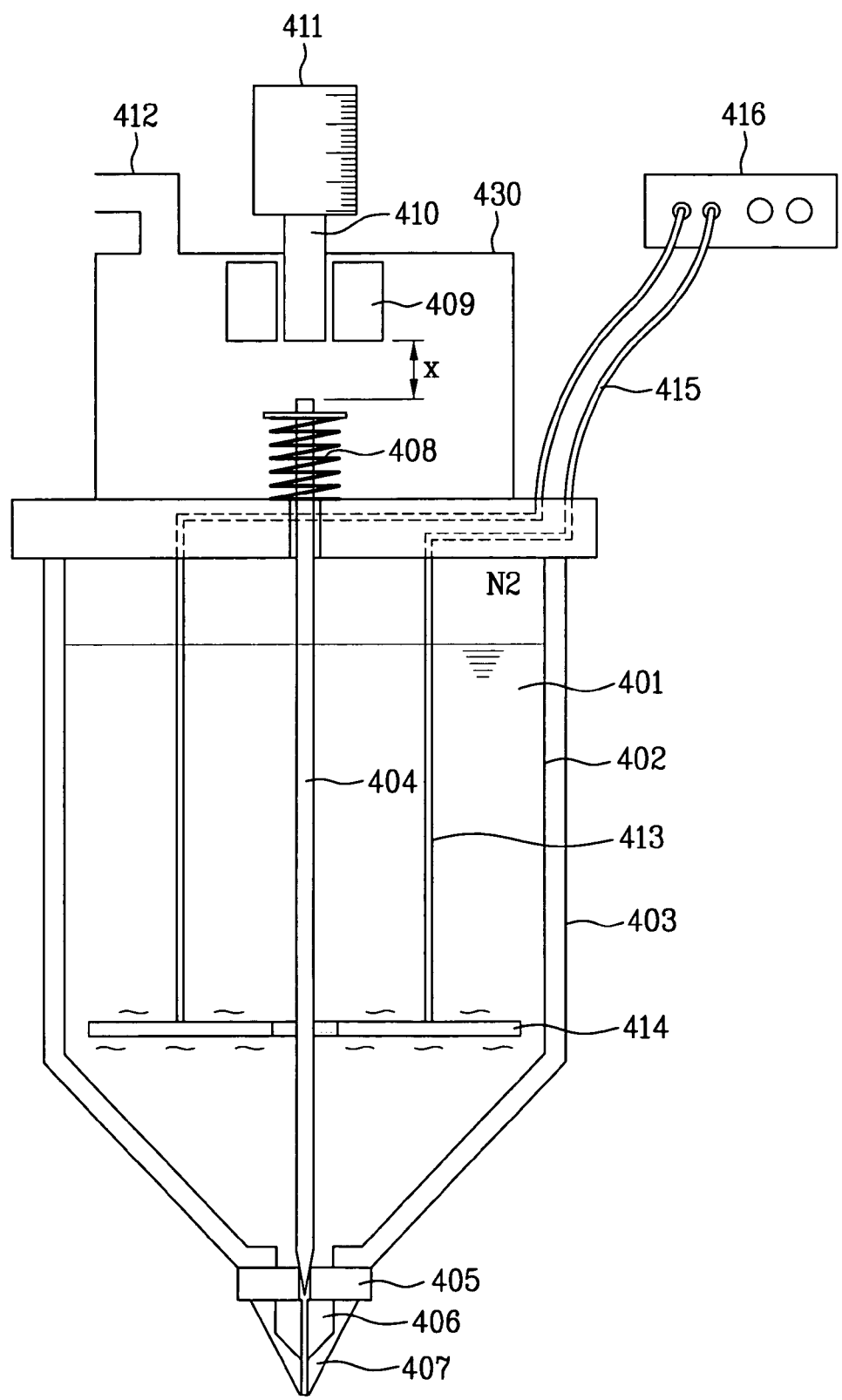
FIG. 4 shows a sectional view illustrating the configuration of a liquid crystal dropping apparatus for liquid crystal display devices according to a second preferred embodiment of the invention.

FIG. 4 shows is a sectional view illustrating the configuration of the liquid crystal dropping apparatus for liquid crystal display devices according to the second preferred embodiment of the invention.

As shown in FIG. 4, the liquid crystal dropping apparatus for use in the manufacture of liquid crystal display devices according to the second preferred embodiment of the invention is formed from a cylindrical liquid crystal container 402 in which liquid crystal 401 is charged, and a case 403 configured to receive the liquid crystal container 402.

The liquid crystal container 402 is typically made of polyethylene, and the case 403 is made of stainless steel. Since polyethylene has excellent formability sufficient to form a desired shape of container in a simplified manner and also has no reactivity with liquid crystal, this polymer has been used to form the liquid crystal container 402. However, polyethylene has a low strength and thus, tends to be easily deformed by an external shock. If the liquid crystal container is deformed by an external shock, it may make it impossible to drop liquid crystal at an accurate position. Therefore, the polyethylene liquid crystal container 402 has to be received in the high-strength stainless steel case 403. However, as discussed above, other materials can be used for the liquid crystal container 402 and the stainless steel case 403.

The interior of the liquid crystal container 402 is provided a vertical needle 404 that is made of a magnetic material. The needle 404 is secured to the liquid crystal container 402 in a vertically movable manner.

Specifically, the needle 404 takes the form of a bar or cylinder and has a conical lower end configured to be inserted into an opening perforated in a needle seat 405 that is provided in the bottom of the liquid crystal container 402. An elastic member 408, such as a spring, is installed around an upper end of the needle 404 so that it is disposed over the liquid crystal container 402. With this configuration, the needle 404 is able to push downward to its original position by the restoration force of the elastic member 208, whereby the conical lower end of the needle 404 can be displaced to open and close the opening of the needle seat 405.

To the lower end of the needle seat 405 are coupled a nozzle 406 and a nozzle cover 407, which are formed with openings having predetermined sizes for the discharge of the liquid crystal 401.

The nozzle cover 407 serves as a coupler, i.e., a coupling means for securing the nozzle 406 at a fixed position. The nozzle 406 is selected from among a variety of nozzles having liquid crystal discharge openings of different sizes and freely exchangeable for regulating the amount of liquid crystal 401 to be dropped.

An upper case 430 is coupled to the top of the liquid crystal container 402, and a gas supply pipe 412 is connected to the upper case 430.

The upper case 430, which is disposed over the top of the liquid crystal container 402, is mounted with a magnetic bar 410 having a gap regulator 411. The magnetic bar 410 is made of a ferromagnetic material or soft magnetic material. A cylindrical solenoid coil 409 is mounted around an outer circumference of the magnetic bar 410. The solenoid coil 409 is connected to a power source (not shown in the drawing). If power is supplied to the solenoid coil 409, the magnetic bar 410 generates a magnetic force. By interacting with the magnetic force, the needle 404 moves upward. Then, if the supply of power to the solenoid coil 409 is interrupted, the needle 404 moves downward to its original position by the restoration force of the elastic member 408, thereby allowing the liquid crystal 401 to be dropped onto a desired position.

In this preferred embodiment, a vibration energy supply device 413 to 416 is additionally provided to apply vibration energy to the liquid crystal 401 charged in the liquid crystal container 204.

Figure 5:
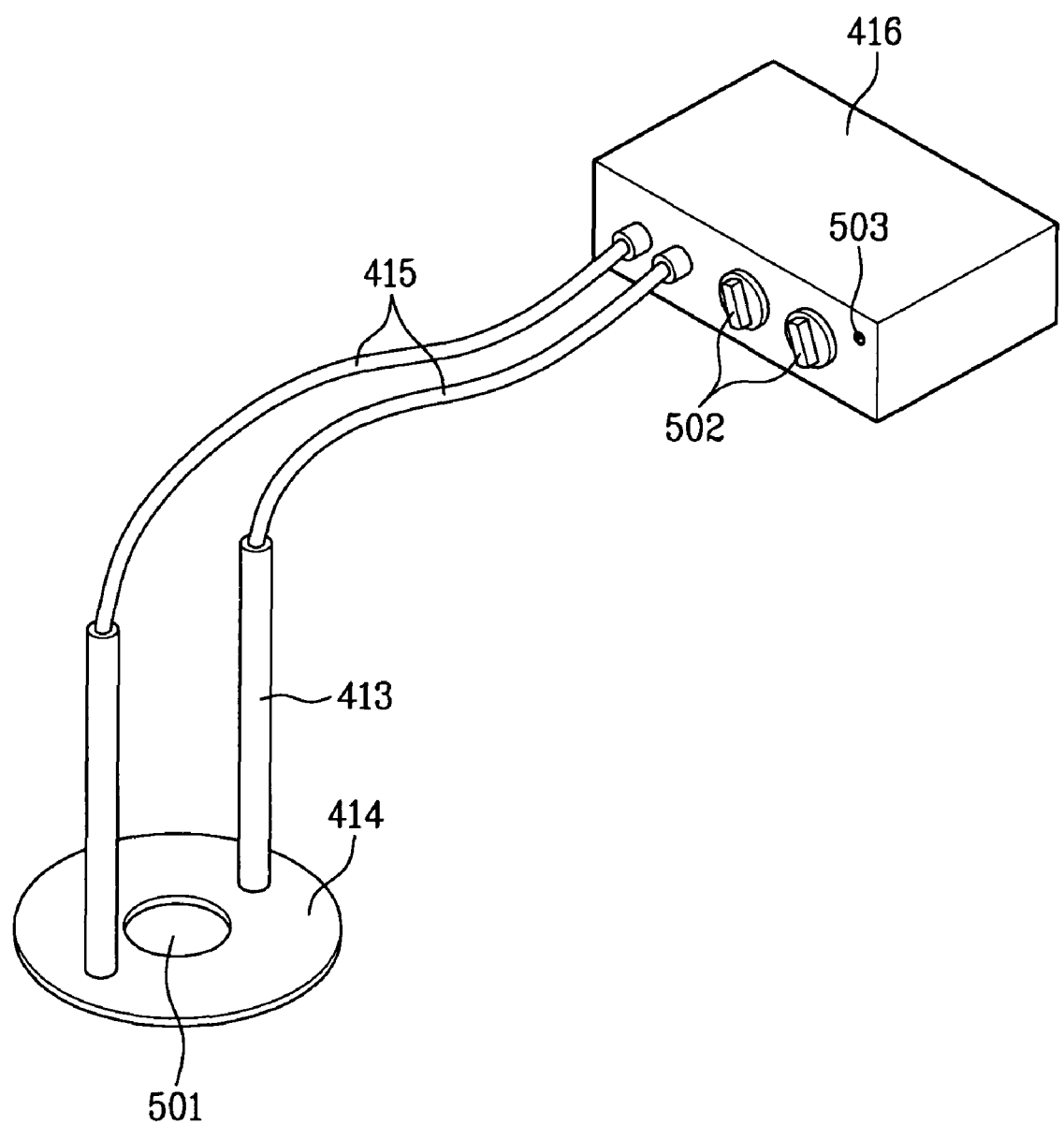
FIG. 5 shows a perspective view illustrating the configuration of a vibration energy supply device shown in FIG. 4.

FIG. 5 shows a perspective view illustrating the configuration of the vibration energy supply device shown in FIG. 4.

FIG. 5 shows the vibration energy supply device formed from an ultrasonic wave generator 416 for generating ultrasonic waves, a converter 414 installed in the liquid crystal container 402 and adapted to perform vibrating motions, signal lines 415 for transmitting the ultrasonic waves generated from the ultrasonic wave generator 416 to the converter 414, and fixing shafts 413 for securing the converter 414 in the liquid crystal container 402 in a vibratable manner.

The converter 414 takes the form of a thin metal disc and is adapted to generate vibration energy based on the magnitude of ultrasonic waves transmitted through the signal lines 415. The converter 414 is centrally formed with an opening 501 so that the needle 404 provided in the liquid crystal container 402 penetrates through the opening 501.

The ultrasonic wave generator 416 has multiple frequency regulating switches 502 capable of regulating the magnitude of ultrasonic waves and a switch 503 capable of controlling ON/OFF conditions of the ultrasonic wave generator 416.

The above described liquid crystal dropping apparatus according to the second preferred embodiment of the invention may perform different liquid crystal dropping operations on the basis of whether the switch 503 of the ultrasonic wave generator 416 is in an ON state or OFF state.

For example, when the switch 503 is in an ON state, ultrasonic waves are applied to the converter 414 to allow the converter 414 to generate vibration energy. The liquid crystal 401 thereby shows wave motions beyond a critical wave height.

Specifically, if the liquid crystal 401 is subjected to vertical vibration, a stationary wave generates at the horizontal surface of the liquid crystal 401. Accordingly, if the critical wave height of the stationary wave generated in the liquid crystal 401 exceeds the limit of stability, then the form of the wave distorts from an end portion thereof as a result of the excessive wave height, thereby causing fine particles to separate with a regular size and to be dropped in a spray-like manner, i.e., as an aerosol.

However, when the switch 503 is in an OFF state, no ultrasonic wave is applied, and the liquid crystal 401 is thus dropped in the form of droplets.

Hereafter, the operation of the liquid crystal dropping apparatus for use in the manufacture of liquid crystal display devices according to the second preferred embodiment of the invention will be described in detail.

First, a predetermined amount of liquid crystal 401 is charged into the liquid crystal container 402, and nitrogen or argon gas is supplied into the liquid crystal container 402 through the gas supply pipe 412.

Here, the reason of supplying nitrogen or argon gas is to maintain the internal pressure of the liquid crystal container 402 at a regular, i.e., constant, level, so as to prevent an irregular amount of liquid crystal 201 from being dropped when a certain region, in the liquid crystal container 402 where no liquid crystal 401 is charged, is subjected to a pressure variation during the dropping of the liquid crystal 401.

The ultrasonic wave generator 416 applies ultrasonic waves to the converter 414 through the signal lines 415.

Specifically, the switch 503 provided at the ultrasonic wave generator 416 is turned ON, and ultrasonic waves having a regular magnitude are continuously applied to the signal lines 415 under control of the frequency regulating switches 502.

The signal lines 415 penetrate through the fixing shafts 413 provided in the liquid crystal container 402 and act to apply the ultrasonic waves to the converter 414.

After receiving the ultrasonic waves from the signal lines 415, the converter 414 subsequently generates vibrations corresponding to the magnitude of the ultrasonic waves, so as to apply vibration energy to the liquid crystal 401.

Next, if power is applied to the solenoid coil 409, the magnetic bar 410 generates a magnetic force to thereby allow the needle 404, which is made of a magnetic material, to move upward by the generated magnetic force.

Accordingly, the opening of the needle seat 405, which comes into contact with the end of the needle 404, opens, and the liquid crystal 401 drops to the outside through the nozzle 406 and the nozzle cover 407.

On the other hand, if the supply of power to the solenoid coil 409 is interrupted, i.e., removed, the needle 404 moves downward by an attractive force of the elastic member 408 that is attached between the upper end of the needle 404 and the liquid crystal container 402, so as to close the opening of the needle seat 405.

The amount of liquid crystal 401 to be dropped may change according to the size of the opening formed in the nozzle 406, the pressure applied to the liquid crystal 401, and the magnitude of vibration of the converter 414 corresponding to the magnitude of ultrasonic waves.

The time required to open the opening of the needle seat 405 via the upward movement of the needle 404 is determined by the distance x between the needle 404 and the magnetic bar 410 as well as the tension of the spring 408 provided at the needle 404.

The magnetic force of the magnetic bar 410 may be regulated according to the number of windings of the solenoid coil 409 provided around the magnetic bar 410, or by the magnitude of power applied to the solenoid coil 409. The distance x between the needle 404 and the magnetic bar 410 may be regulated by the gap regulator 411.

Figure 6:
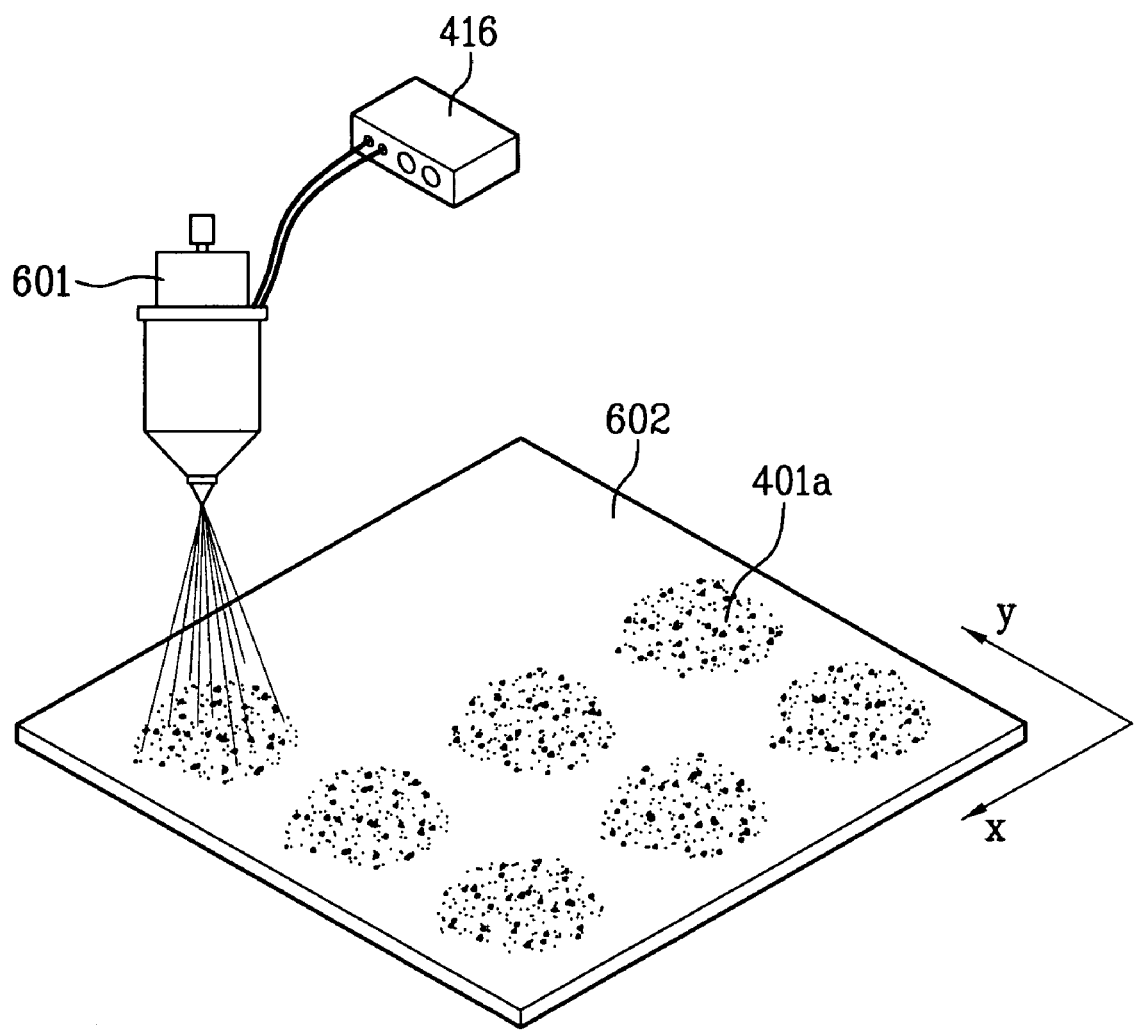
FIG. 6 shows a perspective view illustrating the basic concept of a dropping process using the liquid crystal dropping apparatus for liquid crystal display devices according to the second preferred embodiment of the invention.

FIG. 6 shows a perspective view illustrating the basic concept of the dropping process using the liquid crystal dropping apparatus for use in the manufacture of liquid crystal display devices according to the second preferred embodiment of the invention.

As shown in FIG. 6, the liquid crystal 401 drops in a spray-like, i.e., aerosol, manner onto a substrate 602 by being vibrated using ultrasonic waves. Accordingly, the liquid crystal 401 can be dropped in the form of fine particles over a wide range of the substrate 602.

The substrate 602 is moved in X-axis and Y-axis directions at a preset speed and the dropping apparatus 601 drops the liquid crystal 401 at a preset time interval. Therefore, liquid crystal particles 401a are dropped onto the substrate 602 as a spray so that they are distributed over a wide range of the substrate 602.

Of course, one may assume that the substrate 602 has a fixed position and only the dropping apparatus 601 is moved in X-axis and Y-axis directions to allow the liquid crystal 401 to be dropped by a regular distance.

However, in this case, the injection range of the liquid crystal particles 401a may change due to movements of the dropping apparatus 601. This causes errors in the dropping position and dropping amount of the liquid crystal particles 401a, it is therefore preferable that the dropping apparatus 601 be maintained at a fixed position and the substrate 602 be moved.

As is apparent from the above description, a liquid crystal dropping apparatus for use in the manufacture of liquid crystal display devices according to the invention has the following effects.

The liquid crystal dropping apparatus for liquid crystal display devices is provided with a vibration energy supply device, to apply vibration energy to liquid crystal material charged in a liquid crystal container, thereby allowing the liquid crystal to be dropped as a spray.

According to the invention, the liquid crystal can be dropped in the form of fine particles onto a substrate and over a wide area of the substrate. This has the effect of preventing undesirable spots from generating on the substrate. Further, even if pressure is applied to the liquid crystal during bonding of the substrate, there is no risk of generating undesirable spots on the substrate because the liquid crystal particles are distributed over a wide range of the substrate.

It will be apparent to those skilled in the art that various modifications and variations can be made in the invention without departing from the spirit or scope of the inventions. Thus, it is intended that the invention covers the modifications and variations of this invention provided they come within the scope of the appended claims and their equivalents.

What is claimed is:

1. A liquid crystal dropping apparatus for use in the manufacture of liquid crystal display devices, comprising:
    a liquid crystal container charging liquid crystal so that a pressure is applied to the liquid crystal;
    an opening and closing device configured to open and close a liquid crystal discharge hole provided at a lower end of the liquid crystal container; and
    a vibration energy supply device configured to supply vibration energy to an interior of the liquid crystal container,
    wherein the vibration energy supply device includes
        an ultrasonic wave generator,
        a converter disposed in the liquid crystal container and adapted to convert ultrasonic waves into vibration, and
        at least one fixing shaft configured to secure the converter in the liquid crystal container.

2. The liquid crystal dropping apparatus according to claim 1, wherein the ultrasonic wave generator comprises at least one frequency regulating switch and a power ON/OFF switch.

3. The liquid crystal dropping apparatus according to claim 1, which further comprises a case to receive the liquid crystal container.

4. The liquid crystal dropping apparatus according to claim 3, wherein the liquid crystal container is formed from polyethylene and the case is formed from stainless steel.

5. The liquid crystal dropping apparatus according to claim 1, wherein the opening and closing device comprises a vertical needle made of magnetic material, the vertical needle being disposed in an interior of the liquid crystal container in a vertically movable manner.

6. The liquid crystal dropping apparatus according to claim 5, wherein a conical lower end of the needle is configured to be inserted in a needle seat provided at the discharge hole.

7. The liquid crystal dropping apparatus according to claim 5, wherein an elastic member is installed around an upper end of the needle so that the elastic member is disposed over the liquid crystal container.

8. The liquid crystal dropping apparatus according to claim 7, wherein the elastic member is a spring.

9. The liquid crystal dropping apparatus according to claim 6, wherein a lower end of the needle seat is coupled to a nozzle and a nozzle cover.

10. The liquid crystal dropping apparatus according to claim 1, wherein an upper case is coupled to a top of the liquid crystal container, and a gas supply pipe is connected to the upper case.

11. The liquid crystal dropping apparatus according to claim 10, wherein the upper case is mounted with a magnetic bar having a gap regulator.

12. The liquid crystal dropping apparatus according to claim 11, wherein the magnetic bar is formed from a ferromagnetic material or a soft magnetic material.

13. The liquid crystal dropping apparatus according to claim 11, wherein a solenoid is mounted around an outer circumference of the magnetic bar.

14. The liquid crystal dropping apparatus according to claim 1, wherein the liquid crystal is applied as a spray.

15. A method for applying a liquid crystal, comprising:
    spraying liquid crystal onto a substrate by vibrating with ultrasonic waves with the liquid crystal dropping apparatus of claim 1.

16. A liquid crystal dropping apparatus for use in the manufacture of liquid crystal display devices, comprising:
    a liquid crystal container in which liquid crystal is charged so that a pressure is applied to the liquid crystal if gas is supplied into the liquid crystal container;
    an opening and closing device configured to open and close a liquid crystal discharge hole provided at a lower end of the liquid crystal container, and the opening and closing device comprises a vertical needle made of magnetic material, the vertical needle being disposed in an interior of the liquid crystal container in a vertically movable manner,
    a vibration energy supply device configured to supply vibration energy to an interior of the liquid crystal container,
    wherein the vibration energy supply device includes
        an ultrasonic wave generator,
        a converter disposed in the liquid crystal container and adapted to convert ultrasonic waves into vibration, and
        at least one fixing shaft configured to secure the converter in the liquid crystal container.

17. A method for applying a liquid crystal, comprising:
    spraying liquid crystal onto a substrate with the liquid crystal dropping apparatus of claim 16.

* * * * *